(12) United States Patent
Taunton (10) Patent No.: US 7,546,330 B2
(45) Date of Patent: *Jun. 9, 2009

(54) SYSTEMS FOR PERFORMING MULTIPLY-ACCUMULATE OPERATIONS ON OPERANDS REPRESENTING COMPLEX NUMBERS

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 10/953,421

(22) Filed: Sep. 30, 2004

(65) Prior Publication Data

US 2005/0071415 A1    Mar. 31, 2005

Related U.S. Application Data

(60) Provisional application No. 60/506,727, filed on Sep. 30, 2003.

(51) Int. Cl.
G06F 7/52 (2006.01)
G06F 7/38 (2006.01)

(52) U.S. Cl. ..................... 708/622; 708/511
(58) Field of Classification Search ........... 708/622, 708/511
See application file for complete search history.

(56) References Cited

U.S. PATENT DOCUMENTS

| | | | | | |
|---|---|---|---|---|---|
| 3,800,130 | A | * | 3/1974 | Martinson et al. | 708/622 |
| 4,354,249 | A | * | 10/1982 | King et al. | 708/622 |
| 5,262,976 | A | * | 11/1993 | Young et al. | 708/628 |
| 5,576,983 | A | * | 11/1996 | Shiokawa | 708/622 |
| 5,936,872 | A | * | 8/1999 | Fischer et al. | 708/622 |
| 7,051,061 | B2 | * | 5/2006 | Becker | 708/511 |
| 2002/0161813 | A1 | * | 10/2002 | Chiueh et al. | 708/622 |
| 2002/0169813 | A1 | * | 11/2002 | Pechanek et al. | 708/622 |

* cited by examiner

Primary Examiner—Tan V Mai
(74) Attorney, Agent, or Firm—Sterne, Kessler, Goldstein & Fox P.L.L.C.

(57) ABSTRACT

A method for multiplying, at an execution unit of a processor, two complex numbers in which a real part and an imaginary part of a product of the multiplying can be stored in a same register of the processor. First data is conveyed along at least a first interconnect of the processor. The first data has a first operand. The first operand represents a first complex number. Second data is conveyed along at least a second interconnect of the processor. The second data has a second operand. The second operand represents a second complex number. The first operand is multiplied at the execution unit by the second operand to produce a first result. The first result represents a third complex number. Third data is stored at a first register of the processor. The third data has the first result. The first result has at least the product of the multiplying.

26 Claims, 9 Drawing Sheets

SYSTEMS FOR PERFORMING MULTIPLY-ACCUMULATE OPERATIONS ON OPERANDS REPRESENTING COMPLEX NUMBERS

CROSS-REFERENCE TO RELATED APPLICATIONS

This application claims the benefit of U.S. Provisional Application No. 60/506,727, filed Sep. 30, 2003, which is incorporated herein in its entirety by reference.

BACKGROUND OF THE INVENTION

1. Field of the Invention

The present invention relates to multiplying complex numbers with a processor.

2. Related Art

In older designs for signal processing systems (such as a Digital Subscriber Line (DSL) modem), which are in general more hardware oriented, functions on complex values, such as the signal equalization process and performing a Fast Fourier Transform (FFT), may be performed by fixed-function logic circuits. However, such system designs are usually difficult to adapt for varying application requirements. In order to increase flexibility in modem development and application, it has become more common to use software to perform the various functions in a signal processing device. As performance levels (such as data rates) required of such devices increase, the requirements of the software efficiently to perform individual processing tasks (such as equalization or FFT) likewise increases.

Performing complex multiplication in software is somewhat complicated to implement. Using conventional instructions (e.g., scalar multiply, add, subtract) it may take several cycles to perform a single complex multiplication. In some circumstances (e.g., in a DSL modem, especially in the case of a multi-channel implementation using a single processor to handle multiple channels), it may be necessary to perform millions of complex multiplications every second, as part of the Fast Fourier Transform (FFT) and/or equalization processes.

The complex multiplication process can therefore represent a significant proportion of the total computational cost for a signal processing system, especially in the case of a system where one processor handles the operations for multiple independent processing channels (e.g., in a multi-line DSL modem in a central office). With increasing workloads—in respect of the increasing complexity of the signal processing protocols (e.g., the number of frequencies for which equalization may be needed, in each channel)—it becomes necessary to improve the efficiency of complex multiplication in such systems.

A further problem concerns details of the equalization process as applied to data values representing two-dimensional data, such as complex frequency amplitudes in a signal processing system (e.g., a receiver for Discrete MultiTone (DMT) transmissions).

In some circumstances, the magnitudes of the input data values (and hence also the equalization factors whose magnitudes will be in inverse proportion to those of the data values) can range widely from one input position (e.g., frequency) to another. In these cases, using a complex multiplication step in which the scaling of the operands is the same for all input positions can be sub-optimal. A fixed scaling has to be chosen carefully. On the one hand, it must handle the case of those input values to be equalized which have the smallest magnitudes (and hence the largest equalization factor magnitudes) without the equalization factor magnitudes overflowing the available range. On the other hand, it must also work with the largest input data values (using the smallest equalization factors) without losing precision as a result of coarse quantization of the equalization factors because of their small magnitudes. This latter aspect is important because, in cases such as DMT, it is often those data values of largest original magnitude that carry the most information and in which the decoding process is most sensitive to errors in the equalized values arising from quantization of the equalization factors.

For these and other reasons, more efficient methods and systems for complex multiply-accumulate operations are needed.

BRIEF SUMMARY OF THE INVENTION

The present invention provides a method for multiplying, at an execution unit of a processor, two complex numbers in which a real part and an imaginary part of a product of the multiplying can be stored in a same register of the processor. First data is conveyed along at least a first interconnect of the processor. The first data has a first operand. The first operand represents a first complex number. Second data is conveyed along at least a second interconnect of the processor. The second data has a second operand. The second operand represents a second complex number. The first operand is multiplied at the execution unit by the second operand to produce a first result. The first result represents a third complex number. Third data is stored at a first register of the processor. The third data has the first result. The first result has at least the product of the multiplying.

Optionally, fourth data can be conveyed along at least a third interconnect of the processor. Here, the fourth data can have a third operand. The third operand can represent a signal that prevents the execution unit from altering the first result.

Optionally, the execution unit can alter the first result so that the first result represents a negative of the third complex number. For example, a second register of the processor can have fifth data. The fifth data can have a fourth operand. The fourth operand can represent zero. The first result can be altered by subtracting, at the execution unit, the first result from the fourth operand so that the first result represents a difference of the subtracting. Again, a signal can optionally be conveyed that causes the execution unit to alter the first result so that the first result represents a negative of the third complex number.

Optionally, the first register can have sixth data. The sixth data can have a fifth operand. The fifth operand can represent a fourth complex number. The first result can be added at the execution unit to the fifth operand so that the first result represents a sum of the adding. Again, a signal can optionally be conveyed that causes the execution unit to add the first result to the fifth operand so that the first result represents a sum of the adding.

Optionally, the first register can have seventh data. The seventh data can have a sixth operand. The sixth operand can represent a fifth complex number. The first result can be subtracted at the execution unit from the sixth operand so that the first result represents a difference of the subtracting. Again, a signal can optionally be conveyed that causes the execution unit to subtract the first result from the sixth operand so that the first result represents a difference of the subtracting.

Optionally, the present invention can also be extended so that a single instruction causes multiplication operations to be performed on additional pairs of complex numbers. In addition to the first operand, the first data can also have a seventh operand. The seventh operand can represent a sixth complex number. The seventh operand can be a most significant bits portion of the first data. The first operand can be a least significant bits portion of the first data. In addition to the second operand, the second data can also have an eighth operand. The eighth operand can represent a seventh complex number. The eighth operand can be a most significant bits portion of the second data. The second operand can be a least significant bits portion of the second data. The seventh operand can be multiplied at the execution unit by the eighth operand to produce a second result. The second result can represent an eighth complex number. The third data can be the first result and the second result. The first result can be a least significant bits portion of the third data. The second result can be a most significant bits portion of the third data. Advantageously, multiplying the first operand by the second operand can be performed in parallel with multiplying the seventh operand by the eighth operand.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is now described with reference to the figures where like reference numbers indicate identical or functionally similar elements. Also in the figures, the left most digit of each reference number identifies the figure in which the reference number is first used.

DETAILED DESCRIPTION OF THE INVENTION

I. Introduction

A. Complex Numbers

Complex numbers are numbers of the form (a+bi), where i is the square root of minus one, and a and b are real numbers. A complex number is the sum of a real part (a) and an imaginary part (bi). Multiplication and addition of complex numbers possess the same commutative and transitive properties as with real numbers. Complex multiplication is distributive over complex addition. Thus, we can evaluate the multiplication of two complex numbers (a+bi) and (c+di) as follows:

$$(a + bi)(c + di) = ac + cbi + adi + (bi)(di)$$
$$= ac + (cb + ad)i + (bd)(i^2)$$
$$= (ac - bd) + (cb + ad)i$$

Complex numbers have numerous applications in mathematics and engineering. As an example, in signal processing applications, when transformed into the frequency domain, an arbitrary signal can be considered as a function that maps frequency onto a complex number. The real and imaginary parts correspond to the relative amplitudes of cosine and sine waves of that frequency respectively. When summed over all frequencies, the amplitudes of the cosine and sine waves make up the signal amplitude.

When a signal is transmitted, its amplitudes and phases are altered, depending upon the resistance, inductance, and capacitance of the circuitry through which the signal passes. In order to recover the original signal, a process of equalization is applied, which can include the step of multiplying a complex amplitude at each frequency by a complex correction-factor, which varies with frequency as it varies over time.

In the abstract, complex numbers have infinite precision. For practical purposes, however, it is usually sufficient to approximate the true value to one of a finite set of values. For example, the real and imaginary components a and b belong to a finite range of integers that are multiplied by a scale-factor. Preferably, the scale-factor is a power of two (either positive or negative). A fixed-point representation of the numbers can be used if all of the numbers on wishes to use can be represented using a common range of integers and a common scale-factor. Arithmetic between numbers having fixed-point representation is referred to as fixed-point arithmetic.

In other situations, a floating-point representation of the numbers can be used if a suitable common scale-factor cannot be found for the ranges of numbers being manipulated. In this case there is no fixed scale-factor, so the position of the (binary) point between the whole number part (if any) and the fractional part (if any) of each value is not fixed, but rather is said to "float". In a floating point representation of numbers, each number comprises at least a mantissa, which represents an integer, and an exponent, which represents a scale-factor specific to that particular number. Both the mantissa part and the exponent part can in general represent both positive and negative numbers. As with fixed point representation, negative exponents allow the representation of numbers with fractional parts. As will be appreciated, there are many possible ways in which floating point numbers can be represented. For example, the mantissa can be represented using sign and magnitude format or using two's complement format. Likewise, the exponent can be represented as a two's complement number, or in an offset manner, or as a sign and magnitude. Additionally, the mantissa might be represented using a normalized format having an "implicit leading one" in which the most significant non-zero bit of the mantissa is not physically represented in the stored format of the number, but is implied to appear one binary place to the left of the top-most bit of the mantissa as stored. As a further variation, different numbers of bits may be assigned to different parts of a floating point number. By way of an example of a floating point number format, one might use a sign bit of a mantissa, along with an 8-bit offset-128 exponent and a 23-bit magnitude of the mantissa (represented using "implicit leading one") for a total of 32 bits.

The complex-conjugate of a complex number (a+bi) is defined as (a−bi). The concept has many uses within mathematics and engineering. As an example, when performing a Fast Fourier Transform (FFT), it is sometimes necessary to multiply one complex number by the complex conjugate of another. The FFT is commonly used in signal processing applications, such as a Digital Subscriber Line (DSL) modem.

B. Single Instruction Multiple Data Processing

Single Instruction Multiple Data (SIMD), describes a style of digital processor design in which a single instruction controls the processing of multiple data values in parallel (all being processed in the same manner).

SIMD operations can be implemented in digital processor designs by data processing units which receive multiple input values. For example, a 64-bit wide input value can be subdivided into and treated as multiple smaller values (e.g., 8×8-bit values, 4×16-bit values, or 2×32-bit values).

To illustrate SIMD working, consider the following exemplary Add Half-words (ADDH) instruction:

ADDH c, a, b

Figure 1:
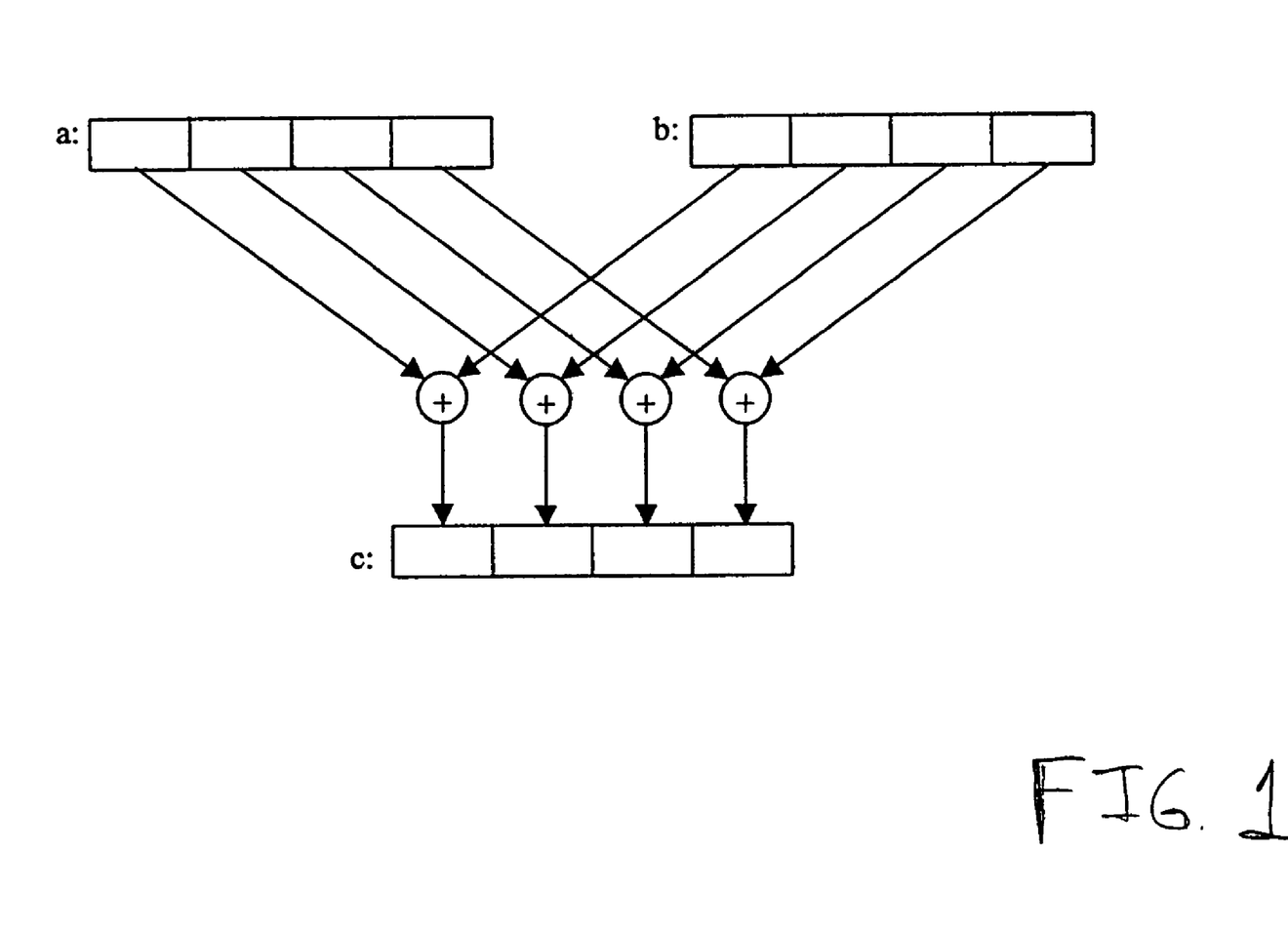
FIG. 1 illustrates an example of a four-way SIMD Add Half-words instruction.

ADDH c, a, b takes as input two 64-bit operands from registers a and b, and writes its result back to register c. ADDH performs four 16-bit (half-word) additions: each 16-bit value in a is added to the corresponding 16-bit value within b to produce 4×16-bit results in the 64-bit output value c. FIG. 1 illustrates an example of a four-way SIMD Add-Half words instruction.

This SIMD method of working allows for an increase in computational power compared with other types of processors where an instruction can only operate on a single set of input data values (e.g., one 16-bit operand from a, one 16-bit operand from b giving one 16-bit result in c). For situations, such as are common in digital signal processing applications, where the same operation is to be performed repeatedly across an array of values, SIMD allows in this instance a speed-up by a factor of four in the basic processing rate, since four add operations can be performed at once rather than only one.

C. Multiply-and-Accumulate Operations

In Digital Signal Processing (DSP), it is common to use convolutions, which are computations of the form:

a=0 for i=1,2,3, . . . , N $a=a+b_i*c_i$

In convolutions such as above, a variable a is used to accumulate the sum of a sequence of products, each formed from two values $b_i$ and $c_i$, for successive values of i. To this end, DSP processors normally include an execution unit (sometimes called a MAC unit) designed to perform the Multiply-and-Accumulate (MAC) operation of a form such as:

MAC ACC, b, c in which the product of values b and c is accumulated in ACC. By successive application of this instruction to different instances of b and c, the required sum can be computed in ACC. At the end of the process the contents of ACC are the value a.

MAC units can be implemented using a special accumulator register (or registers) to hold the accumulating value of a. Such an accumulator register ACC may utilize a larger number of bits to represent the value of the accumulated sum than are used to represent the values of b or c. In this way, it can be guaranteed that overflow does not occur in the arithmetic calculations implemented in the MAC unit, at least when the number of successive MAC operations performed for a single sum of products calculation is constrained. For example, if b and c are held as 16-bit values, then there may be 32 bits or more (e.g. 40 bits) in the ACC register. If no precision is to be lost, it is preferred to use a 32-bit accumulator to hold a single product, to ensure no overflow. Greater numbers of bits can be used. For example, if the accumulator actually contains 40 bits, a total of $2^{(40-32)}$=256 MAC operations can be performed without risk of overflow.

It can also be that the value in ACC will need to be scaled down for further use. This is particularly likely if the value in ACC is accumulated directly with b and c being integer (whole) values. For example, if computing the average of the sequence of products in the above example, the value of 'a', after it is determined by the 'for' loop, will need to be divided by the value N. Alternatively, it can be that one or both of the $b_i$ and $c_i$ values are to be interpreted not as whole numbers (integers) but as binary fixed-point fractions using some number of binary value positions after the binary point. For example, the $b_i$ values may be considered as integers whereas the $c_i$ values might be considered as fractional numbers with f bits of fraction. (Note: this consideration is not usually taken into account by the circuitry implementing the multiplication function—it simply acts to create a product as if both input values and the output value were all simply binary-coded integers.) In this case, assuming no loss of precision in the MAC unit, and that it is desired that the result a be also rounded to an integer value as the $b_i$ values are, it will be necessary to scale down the ACC value, removing the least-significant f bits of it, to create such a result.

D. SIMD MAC Operations and Accumulator Access

In an embodiment, a processor includes two or more SIMD MAC units, each SIMD MAC unit being capable of operations such as:

MACSSH mX, rA, rB

This performs a four-way SIMD half-word multiplication of each of four 16-bit lanes (each treated as signed two's complement binary coded numbers) of general purpose register rA with the corresponding lanes of general purpose register rB, creating four 32-bit products. It then accumulates the four product values into each of four 40-bit lanes in an accumulator register mX (chosen, for example, from four available registers: m0, m1, m2 and m3). To move the accumulated values from an accumulator register back into a general purpose register, there can be provided instructions such as:

MMVH rN, mX, #K

This instruction allows four 16-bit contiguous subsections, one from each of the four 40-bit lanes of accumulator mX, to be extracted and placed into the general register rN as a composite 64-bit value. The value of K is chosen, for example, from a range between 0 and 24 to select which of the 25 possible positions of 16 consecutive bits within each 40-bit lane is extracted (this corresponds to discarding the lowest K bits of the accumulator, as discussed above in relation to scaling of accumulated values.)

A variation on the MMVH instruction can allow the selection of the 16-bit subsections from each lane of the accumulator to be performed under dynamic control rather than using a fixed position (K) specified directly in the instruction. This can be achieved, for example, using a version of the instruction of the form:

MMVH rN, mX, rK where the rK operand is a general purpose register rather than a constant, and is considered in SIMD fashion as four 16-bit lanes, each of which contains a value (as before, chosen from the range between 0 and 24) to define for the corresponding lane of the accumulator mX which bits should be extracted.

Further refinement of the exact behavior of such operations can be provided by a control register which controls details of the extraction process. Options controlled in this way include rounding of the result, based on the fractional value of the discarded bits, and saturation of each result lane based on the value of the more significant bits in the accumulator lane, such that the result can lie in a defined range, e.g. between −32768 and +32767, or between 0 and 65536.

E. Variations on the MAC Operation

A number of variations on the basic SIMD MAC instructions can also be implemented, which allow a greater range of functionality.

For example, to reduce the cost of performing convolutions, particularly short ones, it is possible to both zero the accumulator and compute the first product to be added to it, in a single instruction. This variant can be achieved, for example, using a version of the instruction such as MZCSSH, which can perform (in four-way SIMD) the operation a=b*c rather than the more general operation a=a+b*c. Typically, this version of the instruction would be used for the first step in a convolution, with the more general MACSSH instruction being used for the remaining steps.

Another variation is to allow the product value to be subtracted from the accumulator register, rather than being added to it. This variant can be achieved, for example, using a version of the instruction such as MDCSSH, which can perform (in four-way SIMD) the operation a=a−b*c.

Also, it is possible to combine the effect of the first two variant forms, i.e. to both zero the accumulator and subtract the product value from it in one operation. This variant can be achieved, for example, using a version of the instruction such as MNCSSH, which can perform (in four-way SIMD fashion) the operation a=−b*c.

All of these variations have benefits for programming, in particular circumstances.

II. Example Implementations

A. Instructions for Complex MAC Operations

The present invention provides four instructions, which reduce the number of cycles needed for software to perform the complex multiplications used in (for example) the FFT and equalization functions. Additionally, the design of these instructions in relation to the execution unit in which they are implemented allows the precision of calculations to be maintained even in more difficult cases. The new instructions are also potentially beneficial in many other applications where complex multiplication or complex multiplication and accumulation operations are required.

An example implementation of the invention is described below. The invention is not, however, limited to the example implementation. Based on the description herein, one skilled in the relevant art(s) will understand that the invention can be implemented in other ways as well. In an embodiment, the example implementation can be used in conjunction with a digital signal processor.

By applying SIMD techniques, these new instructions perform two complex MAC-type operations at once. Four variants of the basic complex MAC-type instruction are provided. In an analog of scalar SIMD MAC instructions, these new instructions perform the following operations:

$a=a+b*c$
$a=b*c$
$a=a-b*c$
$a=-b*c$

Here:
- b and c are each complex values represented by 32-bit lanes, subdivided into a 16-bit real part and a 16-bit imaginary part (both considered as two's complement signed numbers);
- a is an 80-bit complex accumulator having two 40-bit fields, one for the real part and one for the imaginary part of the accumulated value;
- + means complex addition; and
- * means complex multiplication (performed with no loss of precision).

Each of the four instruction variants implements two instances of its respective operation in two-way SIMD fashion, one using the lower 32-bit lane of each 64-bit input register and the lower 80-bit lane of the 160-bit accumulator register, and the other using the corresponding upper lane of each respective register.

In practice, the implementation of these instructions in a processor can be achieved such that one instruction performs two complete complex MAC-type functions (i.e., two-way SIMD) in a single operation, which is spread over a number of pipeline stages. Each execution unit is capable of accepting an instruction to perform a SIMD complex MAC-type operation on every processor clock cycle. By comparison, the best method previously available without this instruction on another processor required a minimum of four operations over four cycles to perform four complex MAC operations, and required a less convenient arrangement of the data in order to do so. Therefore, a benefit of these new instructions is that they increase the efficiency of complex multiplication and complex MAC operations.

Furthermore, in implementing these SIMD complex MAC-type instructions, access to the final complex accumulator values can be performed using existing MMVH-type instructions (as described above). The four resulting lanes include the real and imaginary fields of both complex numbers represented in the accumulator register. Thus, the flexibility of the options applicable to MMVH-type operations is also available for use in relation to complex results. For example, the scaling of each complex multiplication can be controlled separately using the relevant form of the MMVH instruction to maximize precision and minimize quantization noise (e.g., for all positions in a multi-frequency equalization function). If required, the scaling can even be varied between the real and imaginary fields of a single complex result.

In the example implementation, the instructions are called 'CMACH', 'CMZCH', 'CMDCH', and 'CMNCH', but the mnemonics used are incidental here. Each is defined to take two 64-bit input operands 'src1' and 'src2' and a 160-bit accumulator operand 'dest'. Each instruction also implicitly takes as input a one-bit flag called 'conjugate' obtained from a control register called 'BSR'. This flag can be set or cleared (using another instruction to write to the control register) according to the required direction of complex multiplication, before using any of these new instruction. The four new instructions are then:

CMACH dest, src1, src2
CMZCH dest, src1, src2
CMDCH dest, src1, src2
CMNCH dest, src1, src2

The operation performed by the CMACH instruction is described by the following sub-operations:
  CMxCH_lane('A', dest.<79..0>, src1.<31..0>, src2.<31..0>)
  CMxCH_lane('A', dest.<159..80>, src1.<63..32>, src2.<63..32>)

The operation performed by the CMZCH instruction is described by the following sub-operations:
  CMxCH_lane('Z', dest.<79..0>, src1.<31..0>, src2.<31..0>)
  CMxCH_lane('Z', dest.<159..80>, src1.<63..32>, src2.<63..32>)

The operation performed by the CMDCH instruction is described by the following sub-operations:
  CMxCH_lane('D', dest.<79..0>, src1.<31..0>, src2.<31..0>)
  CMxCH_lane('D', dest.<159..80>, src1.<63..32>, src2.<63..32>)

The operation performed by the CMNCH instruction is described by the following sub-operations:
  CMxCH_lane('N', dest.<79..0>, src1.<31..0>, src2.<31..0>)
  CMxCH_lane('N', dest.<159..80>, src1.<63..32>, src2.<63..32>)

The sub-operation CMxCH_lane(op, d, s1, s2) used in the above descriptions is defined as:
  If: (BSR.conjugate)
  Then:
    {ACC(op, d.reAc, ((s1.re*s2.re)+(s1.im*s2.im))
     ACC(op, d.imAc, ((s1.im*s2.re)−(s1.re*s2.im))}
  Else:
    {ACC(op, d.reAc, ((s1.re*s2.re)−(s1.im*s2.im))
     ACC(op, d.imAc, ((s1.im*s2.re)+(s1.re*s2.im))}

The sub-operation ACC(op, accReg, product) used in the definition of CMxCH lane is in turn defined as:
  If: (op='A')
  Then: accReg=ADD40(accReg, SXT40(product))
  Else:
    If: (op='Z')
    Then: accReg=SXT40(product)
    Else:
      If: (op='D')
      Then: accReg=SUB40(accReg, SXT40(product))
      Else:
        If: (op='N')
        Then: accReg=SUB40(0, SXT40(product))

In the above descriptions and sub-operation definitions, the following syntactic and semantic definitions apply:

val.n (where val stands for any identifier such as dest, s1, product, etc. and n stands for an integer, e.g. 45) means bit n of value val, where bit 0 is the least significant bit and bit 1 is the next more significant bit, etc.;

val.<m..n> means the value comprised of the linear bit sequence (val.m, val.(m−1), ..., val.n) where val.m is the most significant bit of the sequence and val.n is the least significant bit of the sequence;

val.re means the 16-bit subsection of the 32-bit value 'val', that comprises the real component of val;

val.im means the 16-bit subsection of the 32-bit value 'val', that comprises the imaginary component of val;

val.reAc means the 40-bit subsection of the 80-bit value 'val', that comprises the real component of val;

val.imAc means the 40-bit subsection of the 80-bit value 'val', that comprises the imaginary component of val;

(a*b) means the 32-bit two's-complement signed result of multiplying the two 16-bit two's-complement signed numbers a and b;

(a+b) means the 33-bit two's-complement signed result of adding the two 32-bit two's-complement signed numbers a and b;

(a−b) means the 33-bit two's-complement signed result of subtracting the 32-bit two's-complement signed number b from the 32-bit two's-complement signed number a;

SXT40(prod) means the 40-bit result of sign-extending the 33-bit two's complement binary-coded value prod to 40 bits by replicating the most significant (sign) bit of prod throughout the extra 7 most significant bits;

ADD40(a, b) means the result using 40-bit two's complement arithmetic of the sum of the 40-bit values a and b; overflow is ignored; and SUB40(a, b) means the result using 40-bit two's complement arithmetic of subtracting the 40-bit value b from the 40-bit value a; overflow is ignored.

B. Method for Multiplying Complex Numbers

Figure 2A:
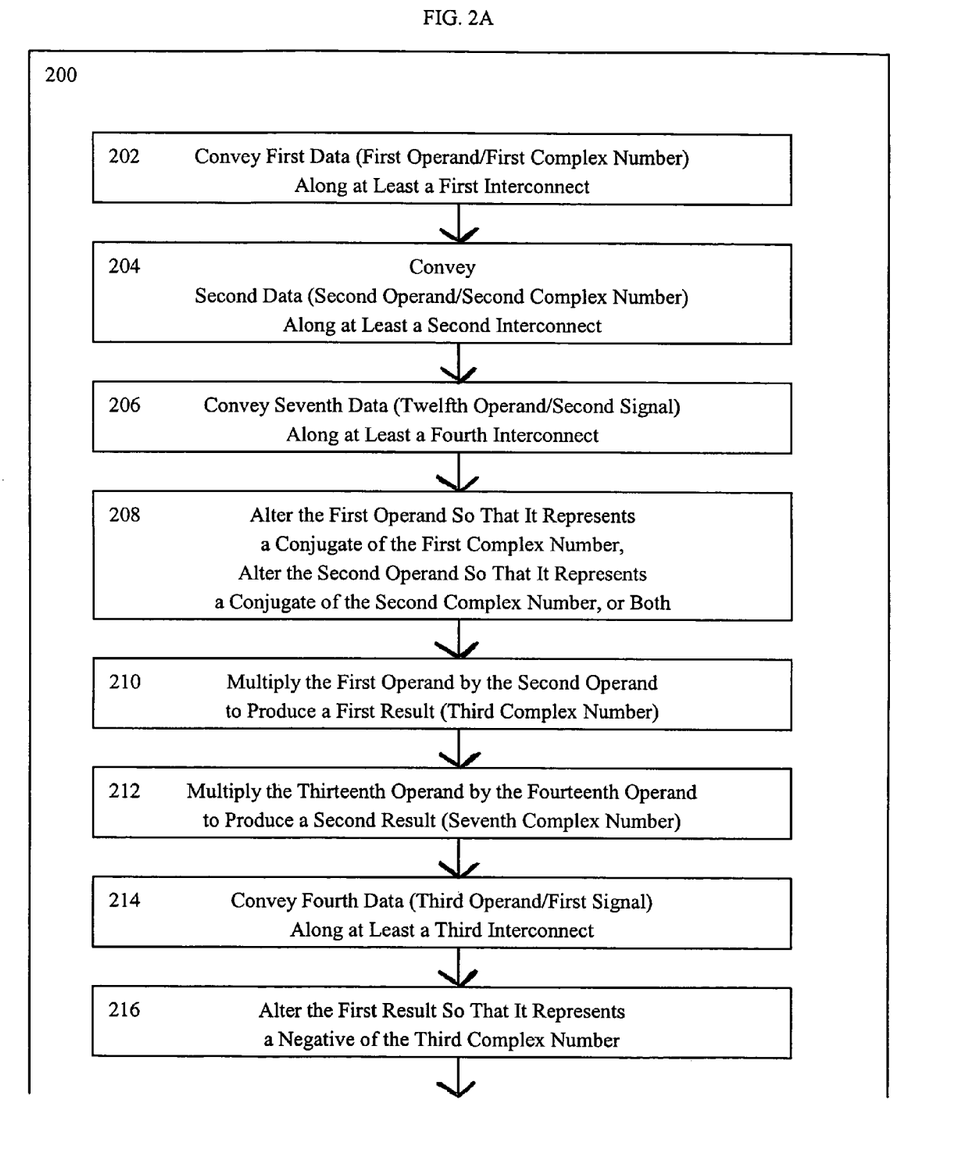
FIGS. 2A and 2B are a flow chart that illustrates a method 200 for multiplying complex numbers in accordance with an embodiment of the present invention.
Figure 2B:
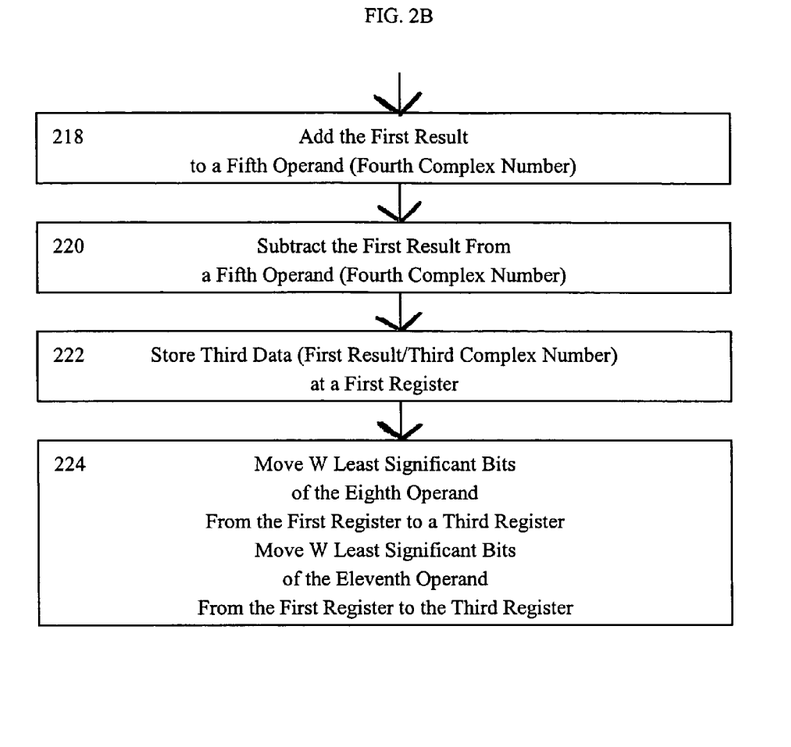

FIGS. 2A and 2B are a flow chart that illustrates a method 200 for multiplying complex numbers in accordance with an embodiment of the present invention.

In method 200, at a step 202, first data is conveyed along at least a first interconnect of a processor. The first data has a first operand. The first operand represents a first complex number.

At a step 204, second data is conveyed along at least a second interconnect of the processor. The second data has a second operand. The second operand represents a second complex number.

At a step 210, the first operand is multiplied at an execution unit of the processor by the second operand to produce a first result. The first result represents a third complex number.

At a step 222, third data is stored at a first register of the processor. The third data has the first result. The first result has at least a product of the multiplying at step 210.

Figure 3:
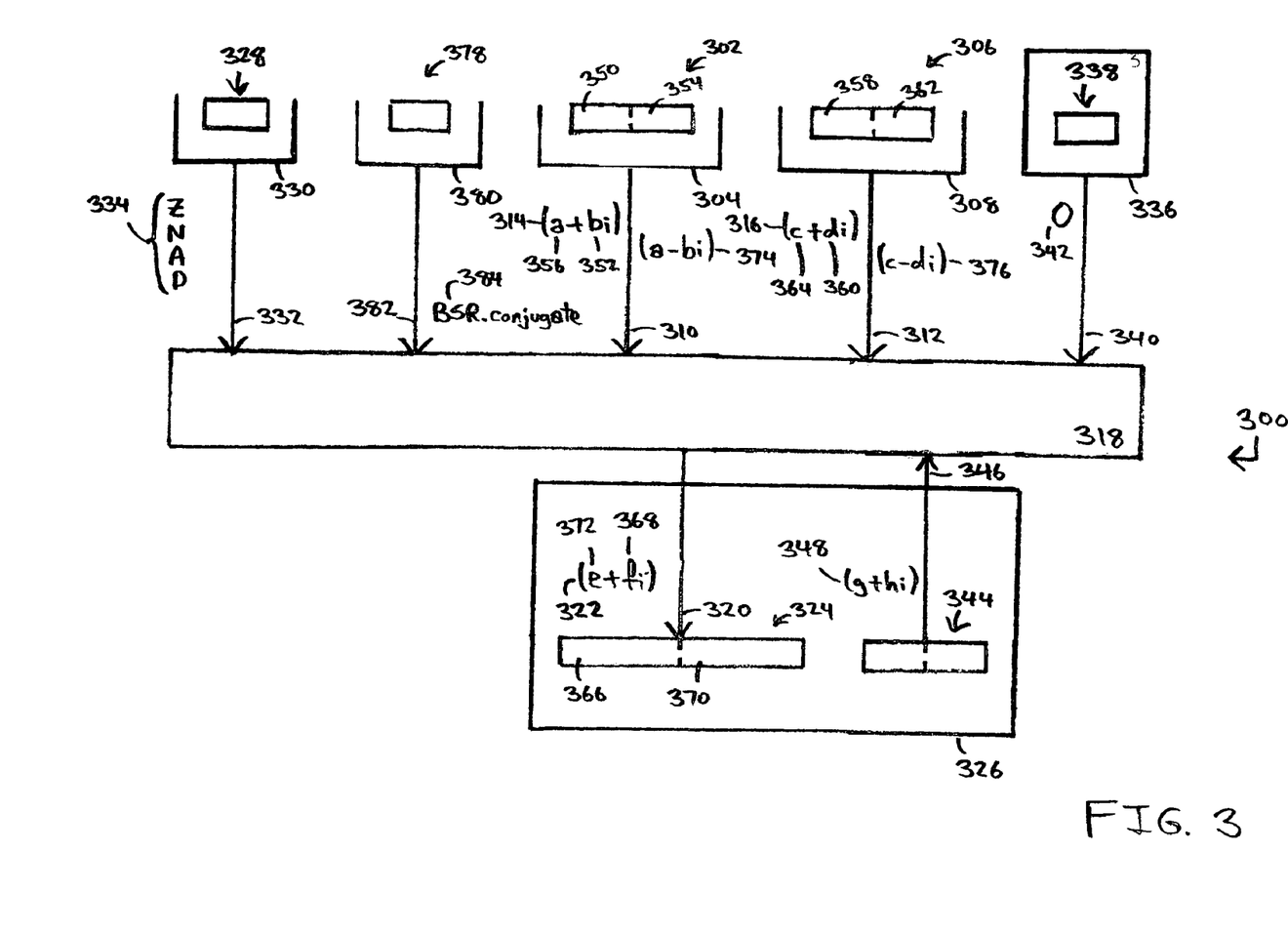
FIG. 3 illustrates an exemplary flow of data through a processor during a performance of method 200.

FIG. 3 illustrates an exemplary flow of data through a processor during a performance of method 200. First data 302 is conveyed along at least a first interconnect 304 of a processor 300. Second data 306 is conveyed along at least a second interconnect 308 of processor 300. First data 302 has a first operand 310. Second data 306 has a second operand 312. First operand 310 represents a first complex number 314. For example, first complex number 314 can be '(a+bi)'. Second operand 312 represents a second complex number 316. For example, second complex number 316 can be '(c+di)'. First operand 310 is multiplied at an execution unit 318 of processor 300 by second operand 312 to produce a first result 320. First result 320 represents a third complex number 322. For example, third complex number 322 can be '(e+fi)'. Third data 324 is stored at a first register 326 of processor 300. Third data 324 has first result 320.

Returning to FIG. 2A, in a first embodiment, the first result represents a product of the multiplying at step 210. Optionally, at a step 214, fourth data is conveyed along at least a third interconnect of the processor. The fourth data has a third operand. The third operand represents a first signal. The first signal prevents the execution unit from altering the first result. For example, at FIG. 3, fourth data 328 is conveyed along at least a third interconnect 330 of processor 300. Fourth data 328 has a third operand 332. Third operand 332 represents a first signal 334. For example, first signal 334 can be 'Z', which prevents execution unit 318 from altering first result 320.

Returning to FIG. 2A, in a second embodiment, at a step 216, the first result is altered at the execution unit so that the first result represents a negative of the third complex number. The first result can be altered directly by the execution unit. For example, at FIG. 3, first result 320 can be altered directly by execution unit 318 so that first result 320 represents a negative of third complex number 322. Returning to step 216 at FIG. 2A, alternatively the third complex number can be subtracted at the execution unit from zero so that the first result represents a difference of the subtracting. A second register of the processor has fifth data. The fifth data has a fourth operand. The fourth operand represents zero. The first result is subtracted at the execution unit from the fourth operand so that the first result represents a difference of the subtracting. For example, at FIG. 3, a second register 336 of processor 300 has fifth data 338. Fifth data 338 has a fourth operand 340. Fourth operand 340 represents zero 342. First result 320 is subtracted at execution unit 318 from fourth operand 340 so that first result 320 represents a difference of the subtracting. Returning to FIG. 2A, the first signal optionally conveyed at step 214 can cause the execution unit to perform the altering at step 216. For example, at FIG. 3, first signal 334 can be 'N', which causes execution unit 318 to perform the altering.

At FIG. 2B, in a third embodiment, the first register has sixth data. The sixth data has a fifth operand. The fifth operand represents a fourth complex number. At a step 218, the first result is added at the execution unit to the fifth operand so that the first result represents a sum of the adding at step 218. For example, at FIG. 3, first register 326 has sixth data 344. Sixth data 344 has a fifth operand 346. Fifth operand 346 represents a fourth complex number 348. For example, fourth complex number 348 can be '(g+hi)'. First result 320 is added at execution unit 318 to fifth operand 346 so that first result 320 represents a sum of the adding. Returning to FIG. 2A, the first signal optionally conveyed at step 214 can cause the execution unit to perform the adding at step 218. For example, at FIG. 3, first signal 334 can be 'A', which causes execution unit 318 to perform the adding.

Returning to FIG. 2B, in a fourth embodiment, at a step 220, the first result is subtracted at the execution unit from the fifth operand so that the first result represents a difference of the subtracting at step 220. For example, at FIG. 3, first result 320 is subtracted at execution unit 318 from fifth operand 346 so that first result 320 represents a difference of the subtracting. Returning to FIG. 2A, the first signal optionally conveyed at step 214 can cause the execution unit to perform the subtracting at step 220. For example, at FIG. 3, first signal 334 can be 'D', which causes execution unit 318 to perform the subtracting.

A most significant bits portion of any operand or any result can represent either an imaginary part of a corresponding complex number or a real part of the corresponding complex number. A least significant bits portion of any operand or any result can also represent either the real part of the corresponding complex number or the imaginary part of the corresponding complex number. If the most significant bits portion represents the imaginary part, then the least significant bits portion represents the real part. If the most significant bits portion represents the real part, then the least significant bits portion represents the imaginary part. Preferably, but not necessarily, the most significant bits portion of each operand and each result represents either the imaginary part or the real part, and the least significant bits portion of each operand and each result represents the part not represented by the most significant bits portion. The imaginary part and the real part can each be represented as a two's complement signed number. Likewise, the imaginary part and the real part can each be represented as a floating point number. The skilled artisan recognizes other schemes by which the imaginary part and the real part can be represented. Therefore, the present invention is not limited to a two's complement representation scheme, a floating point number scheme, or any combination of these schemes.

For example, at FIG. 3, a most significant bits portion 350 of first operand 310 represents an imaginary part 352 of first complex number 314, a least significant bits portion 354 of first operand 310 represents a real part 356 of first complex number 314, a most significant bits portion 358 of second operand 312 represents an imaginary part 360 of second complex number 316, a least significant bits portion 362 of second operand 312 represents a real part 364 of second complex number 316, a most significant bits portion 366 of first result 320 represents an imaginary part 368 of first result 320, and a least significant bits portion 370 of first result 320 represents a real part 372 of first result 320.

Figure 4:
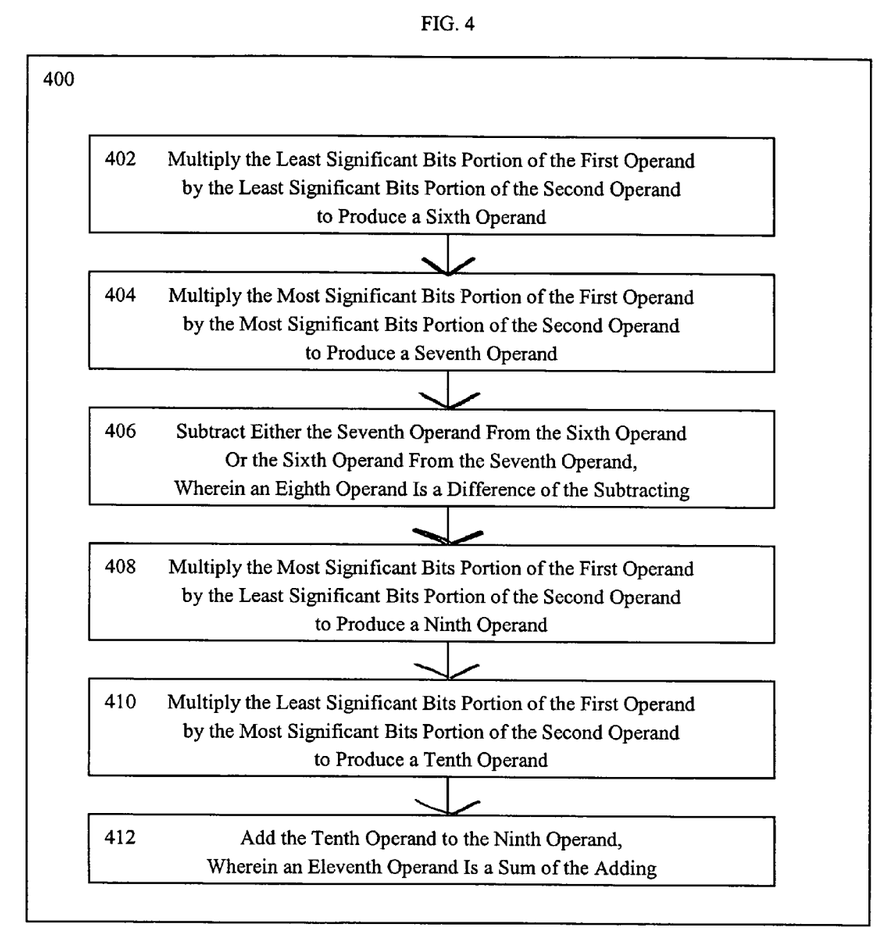
FIG. 4 is a flow chart that illustrates a method 400 for performing the multiplying at step 210 of method 200.

FIG. 4 is a flow chart that illustrates a method 400 for performing the multiplying at step 210 of method 200. In method 400, at a step 402, the least significant bits portion of the first operand is multiplied at the execution unit by the least significant bits portion of the second operand to produce a sixth operand. At a step 404, the most significant bits portion of the first operand is multiplied at the execution unit by the most significant bits portion of the second operand to produce a seventh operand. At a step 406, if the least significant bits portion of each of the first operand and the second operand is the real part of the corresponding complex number and the most significant bits portion of each of the first operand and the second operand is the imaginary part of the corresponding complex number, then the seventh operand is subtracted at the execution unit from the sixth operand. Otherwise, if the least significant bits portion of each of the first operand and the second operand is the imaginary part of the corresponding complex number, then the sixth operand is subtracted at the execution unit from the seventh operand. An eighth operand is a difference of the subtracting at step 406. At a step 408, the most significant bits portion of the first operand is multiplied at the execution unit by the least significant bits portion of the second operand to produce a ninth operand. At a step 410, the least significant bits portion of the first operand is multiplied at the execution unit by the most significant bits portion of the second operand to produce a tenth operand. At a step 412, the tenth operand is added at the execution unit to the ninth operand. An eleventh operand is a sum of the adding at step 412. Advantageously, the multiplying at steps 402, 404, 408, and 410 can be performed in parallel. Advantageously, the subtracting at step 406 and the adding at step 412 can also be performed in parallel.

Figure 5:
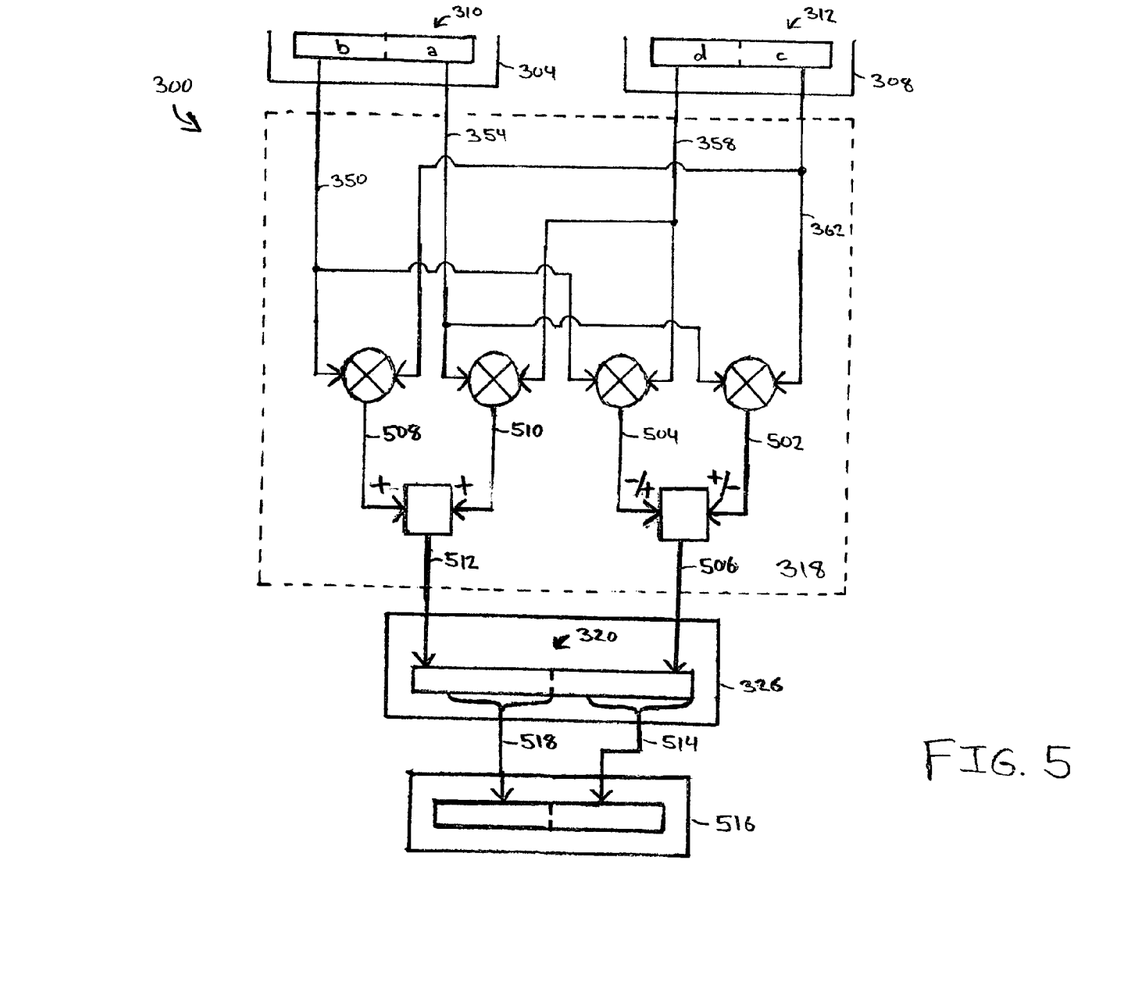
FIG. 5 illustrates an exemplary flow of data through a processor during a performance of method 400.

FIG. 5 illustrates an exemplary flow of data through a processor during a performance of method 400. Least significant bits portion 354 of first operand 310 is multiplied at execution unit 318 by least significant bits portion 362 of second operand 312 to produce a sixth operand 502. Most significant bits portion 350 of first operand 310 is multiplied at execution unit 318 by most significant bits portion 358 of second operand 312 to produce a seventh operand 504. Either seventh operand 504 is subtracted at execution unit 318 from sixth operand 502 or sixth operand 502 is subtracted at execution unit 318 from seventh operand 504. An eighth operand 506 is a difference of the subtracting. Most significant bits portion 350 of first operand 310 is multiplied at execution unit 318 by least significant bits portion 362 of second operand 312 to produce a ninth operand 508. Least significant bits portion 354 of first operand 310 is multiplied at execution unit 318 by most significant bits portion 358 of second operand 312 to produce a tenth operand 510. Tenth operand 510 is added at execution unit 318 to ninth operand 508. An eleventh operand 512 is a sum of the adding.

Each of least significant bits portion 354 of first operand 310, most significant bits portion 350 of first operand 310, least significant bits portion 362 of second operand 312, and most significant bits portion 358 of second operand 312 can be represented as an H-bit two's complement signed number. For example, H can be equal to sixteen. Each of sixth operand 502, seventh operand 504, ninth operand 508, and tenth operand 510 can be represented as a W-bit two's complement signed number, wherein W equals 2H. For example, W can be equal to thirty-two. Each of eighth operand 506 and eleventh operand 512 can be represented as an A-bit two's complement signed number, wherein A is equal to (W+1) or greater than (W+1). A value of a (W+1) least significant bit indicates a sign of the A-bit two's complement signed number. If A is greater than (W+1), then a value of [A−(W+1)] most significant bits of the A-bit two's complement signed number can be equal to the value of the (W+1) least significant bit of the A-bit two's complement signed number. For example, A can be equal to forty and the value of the seven most significant bits of the 40-bit two's complement signed number can be equal to the value of the thirty-third least significant bit of the 40-bit two's complement signed number. The value of the thirty-third least significant bit indicates the sign of the 40-bit two's complement signed number.

Returning to FIG. 2B, at an optional step 224, H least significant bits of the eighth operand at the first register are moved to a third register of the processor and H least significant bits of the eleventh operand at the first register are moved to the third register. For example, at FIG. 5, H least significant bits 514 of eighth operand 506 at first register 326 are moved to a third register 516 of processor 300 and H least significant bits 518 of eleventh operand 512 at first register 326 are moved to third register 516.

Returning to FIG. 2A, in some applications, it can be desirable that the product of the multiplying at step 210 be equivalent to a product of multiplying one of the complex numbers by the conjugate of the other complex number or equivalent to a product of multiplying the conjugates of both complex numbers. The skilled artisan recognizes that this can be accomplished through several means such as, but not limited to: (1) altering one (or both) operand(s) so that it (they) represent a conjugate(s) of the respective complex number(s) and (2) modifying the method for performing the multiplying at step 210.

In an embodiment, causing the product of the multiplying at step 210 to be equivalent to a product of multiplying one of the complex numbers by the conjugate of the other complex number or to be equivalent to a product of multiplying the conjugates of both complex numbers can be accomplished by altering one (or both) operand(s) so that it (they) represent a conjugate(s) of the respective complex number(s). At an optional step 208, the first operand can be altered by the execution unit so that the first operand represents a conjugate of the first complex number, the second operand can be altered by the execution unit so that the second operand represents a conjugate of the second complex number, or both. For example, at FIG. 3, first operand 310 can be altered by execution unit 318 so that first operand 310 represents a conjugate 374 of first complex number 314, second operand 312 can be altered by execution unit 318 so that second operand 312 represents a conjugate 376 of second complex number 316, or both. For example, conjugate 374 of first complex number 314 can be '(a−bi)' and conjugate 376 of second complex number 316 can be '(c−di)'.

Returning to FIG. 2A, at an optional step 206, seventh data is conveyed along at least a fourth interconnect of the processor. The seventh data has a twelfth operand. The twelfth operand represents a second signal. The second signal causes the execution unit to perform the altering at step 208. For example, at FIG. 3, seventh data 378 is conveyed along at least a fourth interconnect 380 of processor 300. Seventh data 378 has a twelfth operand 382. Twelfth operand 382 represents a second signal 384. For example, second signal 384 can be 'BSR.conjugate'. If BSR.conjugate equals one, for example, then execution unit 318 performs the altering; alternatively, if BSR.conjugate equals zero, for example, then execution unit 318 does not perform the altering.

Returning to FIG. 2A, in another embodiment, causing the product of the multiplying at step 210 to be equivalent to a product of multiplying one of the complex numbers by the conjugate of the other complex number can be accomplished by modifying the method for performing the multiplying at step 210. Having BSR.conjugate, the second signal optionally conveyed at step 206, equal to zero can cause the execution unit to perform the multiplying at step 210 according to method 400 (or an equivalent). Alternatively, having BSR.conjugate equal to one can cause the execution unit to perform the multiplying at step 210 according to a method 600 (or an equivalent) as described below.

Figure 6:
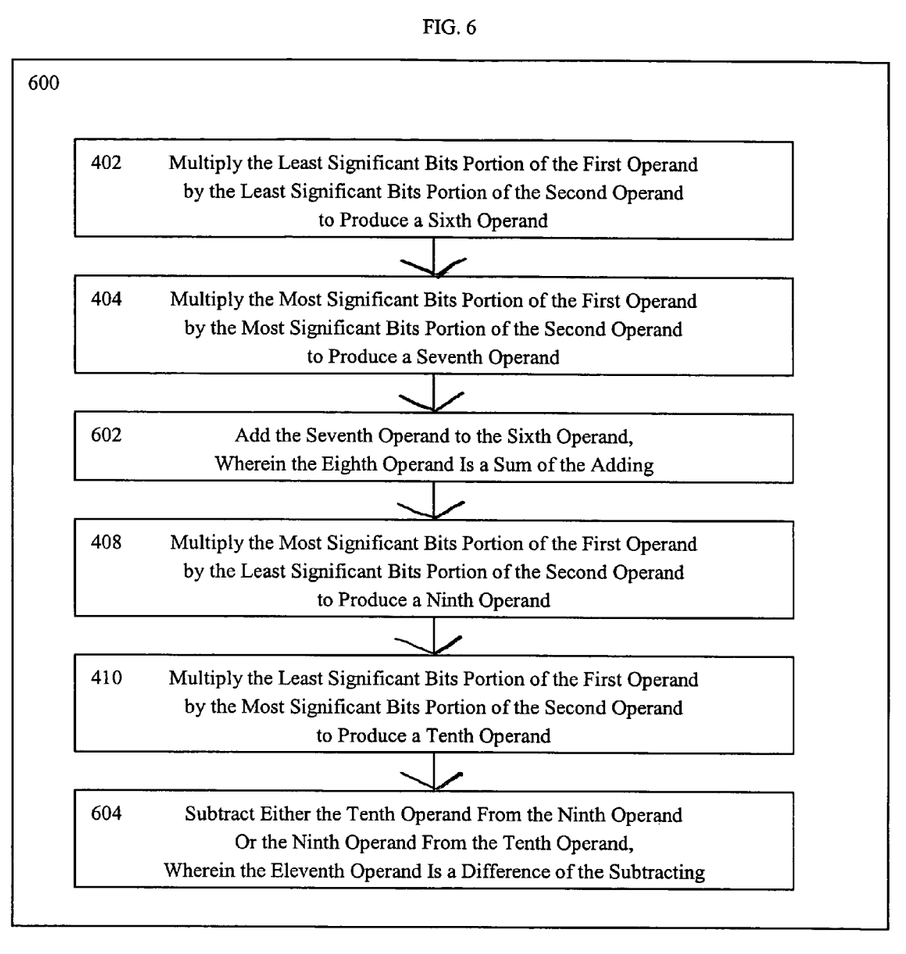
FIG. 6 is a flow chart that illustrates an alternative method 600 for performing the multiplying at step 210 of method 200.

FIG. 6 is a flow chart that illustrates an alternative method 600 for performing the multiplying at step 210 of method 200. In method 600, at step 402, the least significant bits portion of the first operand is multiplied at the execution unit by the least significant bits portion of the second operand to produce the sixth operand. At step 404, the most significant bits portion of the first operand is multiplied at the execution unit by the most significant bits portion of the second operand to produce the seventh operand. At a step 602, the seventh operand is added at the execution unit to the sixth operand. The eighth operand is a sum of the adding at step 602. At step 408, the most significant bits portion of the first operand is multiplied at the execution unit by the least significant bits portion of the second operand to produce the ninth operand. At step 410, the least significant bits portion of the first operand is multiplied at the execution unit by the most significant bits portion of the second operand to produce the tenth operand. At a step 604, if the least significant bits portion of each of the first operand and the second operand is the real part of the corresponding complex number, then the tenth operand is subtracted at the execution unit from the ninth operand. Otherwise, if the least significant bits portion of each of the first operand and the second operand is the imaginary part of the corresponding complex number, then the ninth operand is subtracted at the execution unit from the tenth operand. The eleventh operand is a difference of the subtracting at step 604. Advantageously, the multiplying at steps 402, 404, 408, and 410 can be performed in parallel. Advantageously, the adding at step 602 and the subtracting at step 604 can also be performed in parallel.

Figure 7:
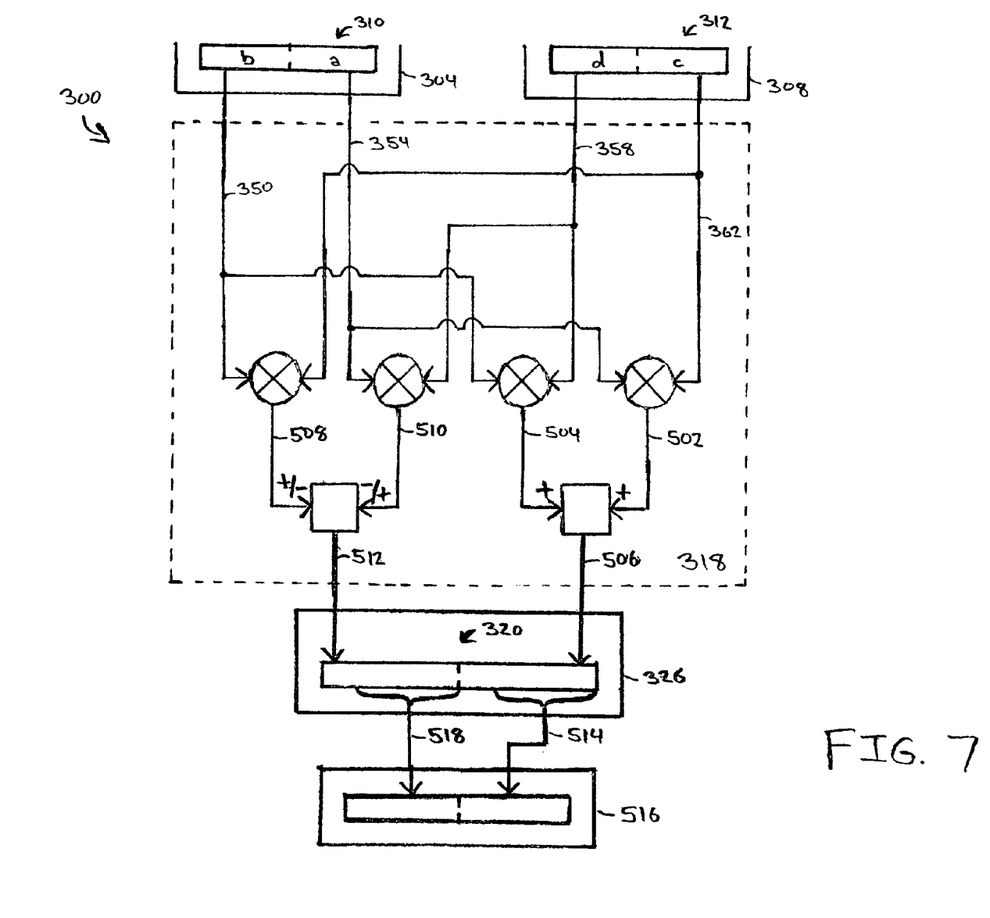
FIG. 7 illustrates an exemplary flow of data through a processor during a performance of method 600.

FIG. 7 illustrates an exemplary flow of data through a processor during a performance of method 600. Least significant bits portion 354 of first operand 310 is multiplied at execution unit 318 by least significant bits portion 362 of second operand 312 to produce sixth operand 502. Most significant bits portion 350 of first operand 310 is multiplied at execution unit 318 by most significant bits portion 358 of second operand 312 to produce seventh operand 504. Seventh operand 504 is added at execution unit 318 to sixth operand 502. Eighth operand 506 is a sum of the adding. Most significant bits portion 350 of first operand 310 is multiplied at execution unit 318 by least significant bits portion 362 of second operand 312 to produce ninth operand 508. Least significant bits portion 354 of first operand 310 is multiplied at execution unit 318 by most significant bits portion 358 of second operand 312 to produce tenth operand 510. Either tenth operand 510 is subtracted at execution unit 318 from ninth operand 508 or ninth operand 508 is subtracted at execution unit 318 from tenth operand 510. Eleventh operand 512 is a difference of the subtracting.

The present invention can also be extended so that a single instruction causes multiply-accumulate operations to be performed on additional pairs of complex numbers. Returning to FIG. 2A, in addition to the first operand, the first data can also have a thirteenth operand. The thirteenth operand can represent a fifth complex number. In addition to the second operand, the second data can also have a fourteenth operand. The fourteenth operand can represent a sixth complex number. In such an embodiment, at a step 212, the thirteenth operand is multiplied at the execution unit by the fourteenth operand to produce a second result. The second result represents a seventh complex number. The third data can be the first result and the second result. Advantageously, multiplying the first operand by the second operand can be performed in parallel with multiplying the thirteenth operand by the fourteenth operand.

The skilled artisan recognizes that the other features of the present invention described above with regards to multiply-accumulate operations performed on a single pair of complex numbers also apply to embodiments in which multiply-accumulate operations are performed on multiple pairs of complex numbers. Therefore, the present invention also encompasses multiply-accumulate operations that include the other features described above and are performed on multiple pairs of complex numbers.

Figure 8:
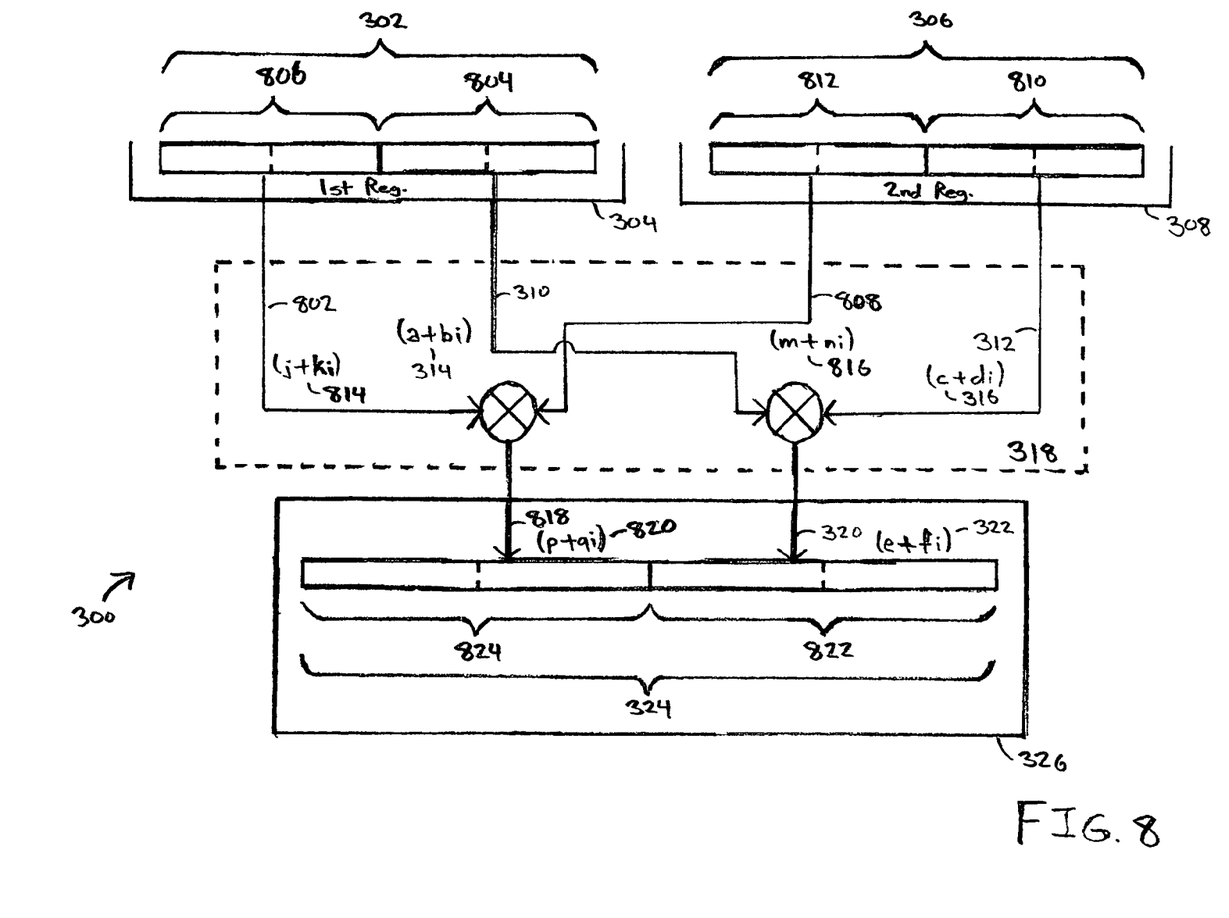
FIG. 8 illustrates an exemplary flow of multiple operand data through a processor during a performance of method 200.

FIG. 8 illustrates an exemplary flow of multiple operand data through a processor during a performance of method 200. First data 302 is conveyed along at least first interconnect 304. First data 302 has first operand 310 and a thirteenth operand 802. First operand 310 is, for example, a least significant bits portion 804 of first data 302. Thirteenth operand 802 is, for example, a most significant bits portion 806 of first data 302. Second data 306 is conveyed along at least second interconnect 308. Second data 306 has second operand 312 and a fourteenth operand 808. Second operand 312 is, for example, a least significant bits portion 810 of second data 306. Fourteenth operand 808 is, for example, a most significant bits portion 812 of second data 306. First operand 310 represents first complex number 314. For example, first complex number 314 can be '(a+bi)'. Second operand 312 represents second complex number 316. For example, second complex number 316 can be '(c+di)'. Thirteenth operand 802 represents a fifth complex number 814. For example, fifth complex number 814 can be '(j+ki)'. Fourteenth operand 808 represents a sixth complex number 816. For example, sixth complex number 816 can be '(m+ni)'.

First operand 310 is multiplied at execution unit 318 by second operand 312 to produce first result 320. First result 320 represents third complex number 322. For example, third complex number 322 can be '(e+fi)'. Thirteenth operand 802 is multiplied at execution unit 318 by fourteenth operand 808 to produce a second result 818. Second result 818 represents a seventh complex number 820. For example, seventh complex number 820 can be '(p+qi)'. Third data 324 can be first result 320 and second result 818. First result 320 is, for example, a least significant bits portion 822 of third data 324. Second result 818 is, for example, a most significant bits portion 824 of third data 324. Third data 324 is stored at first register 326.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for multiplying complex numbers, comprising:
a first register configured to store first data having a first operand, the first operand representing a first complex number;
a second register configured to store second data having a second operand, the second operand representing a second complex number;
a processor configured to perform a multiplication of the first operand by the second operand to produce a first result, the first result representing a third complex number; and
a third register configured to store third data having the first result, the first result having at least a product of the multiplication, wherein each of a least significant bits portion of the first operand, a most significant bits portion of the first operand, a least significant bits portion of the second operand, and a most significant bits portion of the second operand is represented as an H-bit two's complement signed number, and each of a least significant bits portion of the first result and a most significant bits portion of the first result is represented as an A-bit two's complement signed number, wherein A is greater than (2H+1), and wherein a value of a (2H+1) least significant bit indicates a sign of the A-bit two's complement signed number, and a value of [A−(2H+1)] most significant bits of the A-bit two's complement signed number is equal to the value of the (2H+1) least significant bit of the A-bit two's complement signed number.

2. The system of claim 1, further comprising:
a fourth register configured to store fourth data having a third operand, the third operand representing a signal that prevents the processor from altering the first result.

3. The system of claim 1, wherein the processor is further configured to perform an alteration of the first result so that the first result represents a negative of the third complex number.

4. The system of claim 3, further comprising:
a fourth register configured to store fourth data having a third operand, the third operand representing zero, wherein the alteration comprises a subtraction of the first result from the third operand so that the first result represents a difference of the subtraction.

5. The system of claim 3, further comprising:
a fourth register configured to store fourth data having a third operand, the third operand representing a signal that causes the processor to perform the alteration.

6. The system of claim 1, wherein the third register has fourth data, the fourth data having a third operand, the third operand representing a fourth complex number, and wherein the processor is further configured to perform an addition of the first result to the third operand so that the first result represents a sum of the addition.

7. The system of claim 6, further comprising:
a fourth register configured to store fifth data having a fourth operand, the fourth operand representing a signal that causes the processor to perform the addition.

8. The system of claim 1, wherein the third register has fourth data, the fourth data having a third operand, the third operand representing a fourth complex number, and wherein the processor is further configured to perform a subtraction of the first result from the third operand so that the first result represents a difference of the subtraction.

9. The system of claim 8, further comprising:
a fourth register configured to store fifth data having a fourth operand, the fourth operand representing a signal that causes the processor to perform the subtraction.

10. The system of claim 1, wherein a most significant bits portion of each of the first operand, the second operand, and the first result represents one of an imaginary part of a corresponding complex number and a real part of the corresponding complex number and a least significant bits portion of each of the first operand, the second operand, and the first result represents one of the real part of the corresponding complex number and the imaginary part of the corresponding complex number, if the most significant bits portion represents the imaginary part, then the least significant bits portion represents the real part, and if the most significant bits portion represents the real part, then the least significant bits portion represents the imaginary part.

11. The system of claim 10, wherein the imaginary part and the real part are each represented as a two's complement signed number.

12. The system of claim 10, wherein the imaginary part and the real part are each represented as a floating point number.

13. The system of claim 10, wherein the multiplication comprises:
a first multiplication of the least significant bits portion of the first operand by the least significant bits portion of the second operand to produce a third operand;
a second multiplication of the most significant bits portion of the first operand by the most significant bits portion of the second operand to produce a fourth operand;
a subtraction of one of the fourth operand from the third operand if the least significant bits portion of each of the first operand and the second operand represents the real part of the corresponding complex number and the most significant bits portion of each of the first operand and the second operand represents the imaginary part of the corresponding complex number, and the third operand from the fourth operand if the least significant bits portion of each of the first operand and the second operand represents the imaginary part of the corresponding complex number and the most significant bits portion of each of the first operand and the second operand represents the real part of the corresponding complex number, wherein a fifth operand is a difference of the subtraction;
a third multiplication of the most significant bits portion of the first operand by the least significant bits portion of the second operand to produce a sixth operand;
a fourth multiplication of the least significant bits portion of the first operand by the most significant bits portion of the second operand to produce a seventh operand; and
an addition of the seventh operand to the sixth operand, wherein an eighth operand is a sum of the addition.

14. The system of claim 13, wherein the first multiplication, the second multiplication, the third multiplication, and the fourth multiplication are performed in parallel.

15. The system of claim 13, wherein the subtraction and the addition are performed in parallel.

16. The system of claim 13, wherein:
the fifth operand is one of the least significant bits portion of the first result if the least significant bits portion of each of the first operand and the second operand represents the real part of the corresponding complex number and the most significant bits portion of each of the first operand and the second operand represents the imaginary part of the corresponding complex number, and the most significant bits portion of the first result if the most significant bits portion of each of the first operand and the second operand represents the real part of the corresponding complex number and the least significant bits portion of each of the first operand and the second operand represents the imaginary part of the corresponding complex number; and
the eighth operand is one of the most significant bits portion of the first result if the least significant bits portion of each of the first operand and the second operand represents the real part of the corresponding complex number and the most significant bits portion of each of the first operand and the second operand represents the imaginary part of the corresponding complex number, and the least significant bits portion of the first result if the most significant bits portion of each of the first operand and the second operand represents the real part of the corresponding complex number and the least significant bits portion of each of the first operand and the second operand represents the imaginary part of the corresponding complex number.

17. The system of claim 13, further comprising:
a fourth register configured to store fourth data having a ninth operand, the ninth operand representing a signal that causes the processor to perform the multiplication.

18. The system of claim 10, wherein the multiplication comprises:
a first multiplication of the least significant bits portion of the first operand by the least significant bits portion of the second operand to produce a third operand;
a second multiplication of the most significant bits portion of the first operand by the most significant bits portion of the second operand to produce a fourth operand;
an addition of the fourth operand to the third operand, wherein a fifth operand is a sum of the addition;
a third multiplication of the most significant bits portion of the first operand by the least significant bits portion of the second operand to produce a sixth operand;
a fourth multiplication of the least significant bits portion of the first operand by the most significant bits portion of the second operand to produce a seventh operand; and
a subtraction of one of the seventh operand from the sixth operand if the least significant bits portion of each of the first operand and the second operand represents the real part of the corresponding complex number and the most significant bits portion of each of the first operand and the second operand represents the imaginary part of the corresponding complex number, and the sixth operand from the seventh operand if the least significant bits portion of each of the first operand and the second operand represents the imaginary part of the corresponding complex number and the most significant bits portion of each of the first operand and the second operand represents the real part of the corresponding complex number, wherein an eighth operand is a difference of the subtraction.

19. The system of claim 18, wherein the first multiplication, the second multiplication, the third multiplication, and the fourth multiplication are performed in parallel.

20. The system of claim 18, wherein the addition and the subtraction are performed in parallel.

21. The system of claim 18, further comprising:
a fourth register configured to store fourth data having a ninth operand, the ninth operand representing a signal that causes the processor to perform the multiplication.

22. The system of claim 1, wherein the processor is further configured to perform an alteration of at least one of the first operand and the second operand so that the at least one of the first operand and the second operand represents a conjugate of at least one of the first complex number and the second complex number.

23. The system of claim 22, further comprising:
a fourth register configured to store fourth data having a third operand, the third operand representing a signal that causes the processor to perform the alteration.

24. The system of claim 1, wherein the first data has a third operand, the third operand representing a fourth complex number, the second data has a fourth operand, the fourth operand representing a fifth complex number, the third data has a second result, the second result representing a sixth complex number, and wherein the processor is further configured to perform a multiplication of the third operand by the fourth operand to produce the second result, the second result representing the sixth complex number.

25. The system of claim 24, wherein the multiplication of the first operand by the second operand is performed in parallel with the multiplication of the third operand by the fourth operand.

26. The system of claim 24, wherein a least significant bits portion of the first data has the first operand, a most significant bits portion of the first data has the third operand, a least significant bits portion of the second data has the second operand, a most significant bits portion of the second data has the fourth operand, a least significant bits portion of the third data has the first result, and a most significant bits portion of the third data has the second result.

* * * * *